US009689189B1

(12) United States Patent
Zinda

(10) Patent No.: US 9,689,189 B1
(45) Date of Patent: Jun. 27, 2017

(54) GATE SYSTEM AND APPARATUS

(71) Applicant: Stephen Douglas Zinda, Houston, TX (US)

(72) Inventor: Stephen Douglas Zinda, Houston, TX (US)

( * ) Notice: Subject to any disclaimer, the term of this patent is extended or adjusted under 35 U.S.C. 154(b) by 0 days.

(21) Appl. No.: 15/333,124

(22) Filed: Oct. 24, 2016

(51) Int. Cl.

| | |
|---|---|
| ***E06B 11/02*** | (2006.01) |
| ***E05F 15/632*** | (2015.01) |
| ***E05F 15/40*** | (2015.01) |
| ***E05F 15/77*** | (2015.01) |
| ***H02K 7/00*** | (2006.01) |
| *H04W 88/06* | (2009.01) |

(52) U.S. Cl.
CPC ............ *E05F 15/632* (2015.01); *E05F 15/40* (2015.01); *E05F 15/77* (2015.01); *E06B 11/026* (2013.01); *H02K 7/003* (2013.01); *H04W 88/06* (2013.01)

(58) Field of Classification Search
CPC ..... E05F 15/632; E06B 11/026; E06B 11/045
USPC ....... 160/216, 222, 223, 224, 62, 71, 80, 24, 160/22
See application file for complete search history.

(56) References Cited

U.S. PATENT DOCUMENTS 832,335 A 10/1906 McDonald
942,067 A 12/1909 Heidt
1,196,444 A 8/1916 Ellis
1,662,167 A * 3/1928 Rexinger .................. E06B 9/02 160/224
2,195,291 A * 3/1940 Zukor .................. E06B 9/0623 109/38
2,531,310 A * 11/1950 Tonn ...................... E06B 11/02 160/223
2,794,498 A * 6/1957 Heckerman ............. E04F 10/10 160/172 R
2,803,471 A * 8/1957 Roth ......................... B60J 1/20 160/104
2,829,712 A * 4/1958 Quinn ....................... E06B 9/01 160/102
2,967,567 A * 1/1961 Heckerman ............. E04F 10/10 160/172 R
3,960,196 A * 6/1976 Berner ...................... F24F 9/00 160/202
4,652,042 A * 3/1987 Bader ...................... B60J 5/062 296/155
4,723,587 A 2/1988 Scruggs, Jr. et al.
4,785,590 A * 11/1988 Jones .................. E04B 1/34305 160/222
4,984,619 A 1/1991 Ellis
6,119,754 A 9/2000 Okonsky
6,178,693 B1 1/2001 Hunt
6,375,165 B1 4/2002 Sherratt
6,378,262 B1 * 4/2002 Mercadante .............. E06B 7/08 160/104
7,322,153 B2 1/2008 Nitz et al.
(Continued)

FOREIGN PATENT DOCUMENTS

GB 2041051 9/1980

Primary Examiner — David Purol

(57) ABSTRACT

The present invention relates to a gate. More specifically, the present invention relates to a gate having at least one arm, wherein the at least one arm is configured to extend and retract. When the at least one arm is substantially extended, the at least one arm substantially prevents access through the gate. When the at least one arm is substantially retracted, the at least one arm no longer substantially prevents access through the gate.

19 Claims, 6 Drawing Sheets

(56) References Cited

U.S. PATENT DOCUMENTS

| | | | | |
|---|---|---|---|---|
| 7,389,806 | B2 * | 6/2008 | Kates | E06B 9/32<br>160/310 |
| 7,518,326 | B2 * | 4/2009 | Shier | E06B 9/68<br>318/16 |
| 7,568,449 | B2 | 8/2009 | Hirokawa et al. | |
| 8,015,752 | B2 | 9/2011 | Fullerton et al. | |
| 8,967,085 | B2 | 3/2015 | Gillis et al. | |
| 9,206,632 | B1 | 12/2015 | Fields | |
| 2006/0107901 | A1 | 5/2006 | Hirokawa et al. | |
| 2007/0113797 | A1 | 5/2007 | Mainini et al. | |
| 2007/0130833 | A1 | 6/2007 | Maital | |
| 2008/0110413 | A1 | 5/2008 | Kobayashi et al. | |
| 2010/0293861 | A1 | 11/2010 | Ting | |
| 2012/0223283 | A1 | 9/2012 | Kobayashi et al. | |
| 2013/0152867 | A1 | 6/2013 | Kaneda et al. | |
| 2014/0261234 | A1 | 9/2014 | Gillis et al. | |
| 2015/0114574 | A1 * | 4/2015 | Fiedler | E05F 15/71<br>160/7 |
| 2016/0000042 | A1 | 1/2016 | Smith et al. | |

* cited by examiner

GATE SYSTEM AND APPARATUS

BACKGROUND OF THE INVENTION

1. Field of the Invention

The invention relates to a gate. More particularly, this invention relates to a gate system and apparatus comprising at least one arm that extends in length to create a barrier that substantially prevents access through the gate and that retracts in length to eliminate the barrier and substantially allow access through the gate.

2. Description of the Related Art

The use of gates has become more and more pervasive in society. For example, gates are commonly used to prevent unauthorized access to an individual's premises, such as a business or residential property. As yet another example, gates are also commonly used to portion off portions of a residential home to confine a pet to a particular area, thereby ensuring the pet does not cause unwanted damage to other areas of the home. Gates similar to those used to restrict the movement of pets are also commonly used to prevent toddlers from accessing certain areas of a home. For example, those gates may be used to prevent a toddler from going up or down stairs, which helps ensure the toddler is not injured.

While the gates described above have proven useful for their primary purpose (i.e., limiting access to a specified area), they presently have a number of drawbacks. For example, they are typically bulky and consume a significant amount of space. As such, they are generally not aesthetically pleasing and require more than the desired amount of space. In the case of gates used for restricting the movement of a toddler or pet, such gates are often not sturdy, and thus are susceptible to tipping or falling over, which can damage walls or doors and present an injury hazard to children and pets. Moreover, the aforementioned gates also pose significant tripping hazards, as they typically require at least one lower lateral portion that extends the entire length of the gate to provide support. Further, such gates generally have static physical dimensions, which means that they may not properly fit into passage ways of a certain size.

Therefore, a need remains for a gate that efficiently uses space, is aesthetically pleasing, is sturdy, is able to adapt to the size of various passageways and/or that reduces or eliminates tripping hazards, while at the same time achieving the primary purpose of limiting or preventing access to a specific area.

SUMMARY OF DISCLOSED EMBODIMENTS

Embodiments of a gate system and apparatus having at least one arm, whereby the arm is adapted to extend in length to create a barrier and retract in length to eliminate the barrier, are described. The embodiments described below are only exemplary, and are not intended to limit the scope of the invention.

In one disclosed embodiment, a gate comprises a motor having a shaft that rotates bidirectionally. The shaft has at least one connector wrapped around a portion of the shaft, such that rotation of the shaft in a first direction by the motor causes the connector to unwind from the shaft and rotation of the shaft in a second direction causes the connector to wind around the shaft.

The gate further comprises at least one arm, whereby the at least one arm has a plurality of portions that slide into one another. When the at least one arm is substantially retracted in length, the plurality of portions are substantially slid into one another. When the at least one arm is substantially extended in length, the plurality of portions are substantially slid apart from one another.

The at least one connector is connected to an interior end of the at least one arm, such that when the motor rotates in the first direction, the at least one connector unwinds from the shaft and extends towards the interior end of the at least one arm, thereby exerting sufficient force on the interior end to cause the plurality of portions of the at least one arm to slide apart from one another. As the plurality of portions of the at least one arm slide apart from one another, the end of the first arm extends until it creates a barrier. For example, the end of the arm may extend until it abuts a wall, thereby creating a barrier that may substantially prevent access there through. Conversely, when the motor rotates in the second direction, the at least one connector winds around the shaft and pulls the interior end of the at least one arm, thereby creating sufficient force to cause the plurality of portions of the arms to slide into one another. As the plurality of portions slide into one another, the end of the at least one arm substantially retracts so that access through the gate may no longer be substantially prevented.

In yet another embodiment, a gate comprises a motor having a shaft that rotates bidirectionally. The shaft has at least one connector wrapped around a portion of the shaft, such that rotation of the shaft in a first direction by the motor causes the at least one connector to unwind from the shaft and rotation of the shaft in a second direction causes the connector to wind around the shaft.

The gate further comprises at least one arm, whereby the at least one arm has a plurality of portions that slide into one another. When the at least one arm is substantially retracted in length, the plurality of portions are substantially slid into one another. When the at least one arm arms is substantially extended in length, the plurality of portions are substantially slid apart from one another. The at least one arm further comprises an interior spring adapted to exert a force on the interior end of the at least one arm and cause the at least one arm to substantially extend. More specifically, when the spring is substantially decompressed, it causes the plurality of portions of the at least one arm to slide apart from one another. Conversely, when the spring is compressed it allows the plurality of portions of the at least one arm to slide into one another.

The at least one connector is connected to an interior end of the at least one arm. When the motor rotates in the first direction, the at least one connector unwinds from the shaft and extends toward the interior end of the arm, thereby allowing the spring force generated by the spring to cause the plurality of portions of the at least one arm to slide apart from one another. As the plurality of portions slide apart, the end of the at least one arm extends until it creates a barrier. For example, the end of the at least one arm may extend until it abuts a wall, thereby creating a barrier that may prevent access there through. Conversely, when the motor rotates in the second direction, the at least one connector winds around the shaft and pulls the interior end of the at least one arm, thereby creating sufficient force to overcome the spring force generated by the spring and allowing the plurality of portions of the at least one arm to slide into one another. As the plurality of portions of the at least one arm slide into one another, the end of the at least one arm retracts so that access through the gate may no longer substantially prevented.

In yet another embodiment, a gate comprises at least one arm having a plurality of portions that slide into one another. When the arm is substantially retracted in length, the plurality of portions of the at least one arm are substantially slid into one another. When the at least one arm is substantially extended in length, the plurality of portions of the at least one arm are substantially slid apart from one another. The at least one arm further comprises a grip or handle adapted for easy gripping by a user so that the user can conveniently manually extend or retract the at least one arm. More specifically, when the at least one arm is fully retracted, the grip or handle may be moved by a user (e.g., pushed or pulled) to cause the at least one arm to extend in length. As the plurality of portions slide apart, the end of the at least one arm extends until it creates a barrier. For example, the end of the at least one arm may extend until it abuts a wall, thereby creating a barrier that may substantially prevent access there through. Conversely, when the at least one arm is fully extended, the grip or handle may be moved by a user (e.g., pushed or pulled) to cause the at least one arm to retract in length. As the plurality of portions slide into one another, the end of the at least one arm retracts so that access through the gate may no longer substantially prevented.

These and other embodiments would be apparent to those having ordinary skill in the art based on consideration of the entire disclosure herein.

BRIEF DESCRIPTION OF THE FIGURES

The accompanying drawings, which are incorporated in and constitute a part of this specification, illustrate implementations of systems and apparatuses consistent with the present disclosure and, together with the detailed description, serve to explain advantages and principles consistent with the present disclosure.

DETAILED DESCRIPTION OF THE SPECIFIC EMBODIMENTS

Figure 1B:
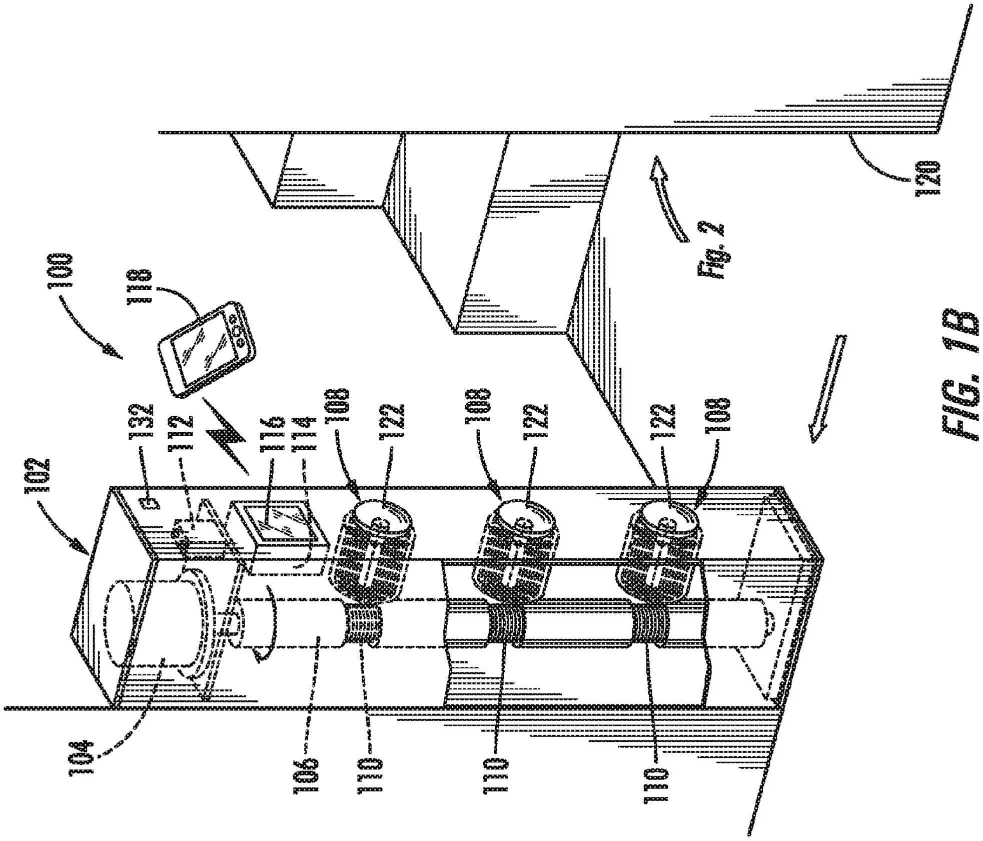
FIG. 1B illustrates a perspective view of a gate system and apparatus comprising a motor, whereby the gate is in a retracted state.
Figure 1A:
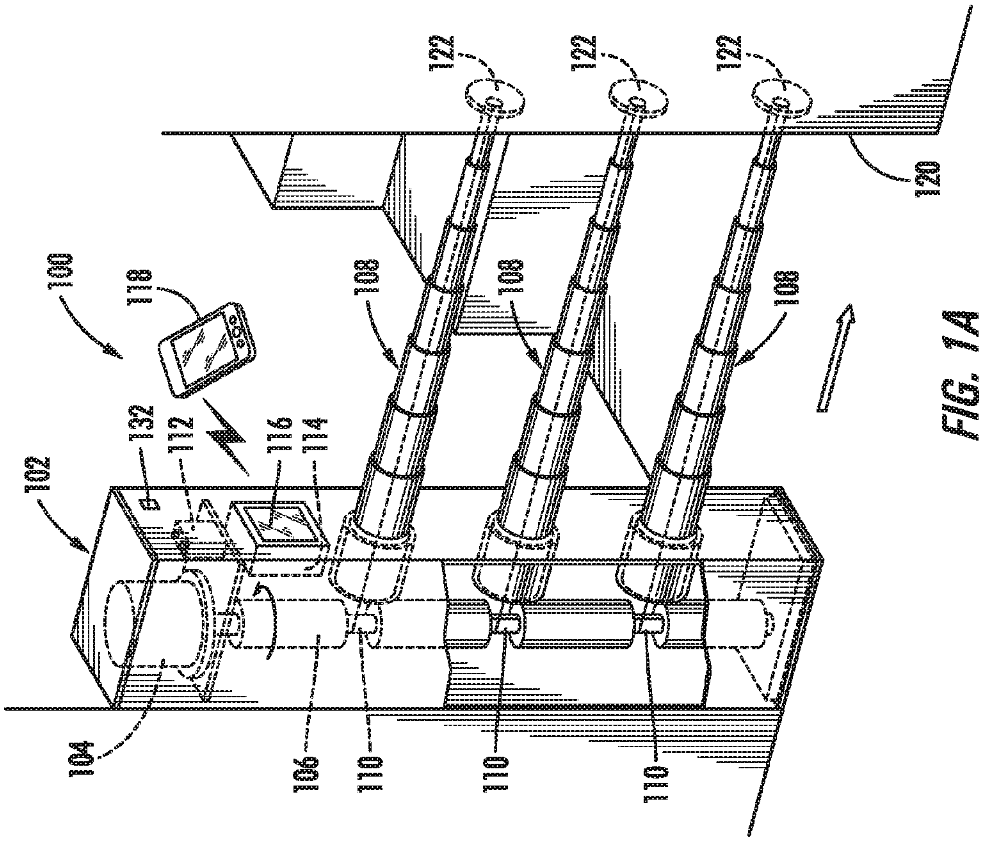
FIG. 1A illustrates a perspective view of an embodiment of a gate system and apparatus comprising a motor, whereby the gate is in an extended state.

With reference now to the figures, and particular in reference to FIG. 1A, a diagram of an embodiment of the present invention is shown. FIG. 1A shows a gate apparatus 100 attached to a wall via housing 102. The gate apparatus 100 comprises a motor 104 having a shaft 106. The shaft 106 is coupled to the motor 104 such that the motor 104 can rotate the shaft 106 bidirectionally to cause arms 108 to extend and retract. The shaft 106 includes portions 110 which correspond to arms 108, respectively. The motor 104 is powered by a DC battery 112 (e.g., a 9 v DC battery). The motor 104 may be controlled by a control box 114 which further comprises a display 116 for displaying information relating to the operation of the gate apparatus. The control box 114 may communicate with a remote device 118, such as smart phone, such that the remote device 118 can remotely control the control box 114. The gate 100 may further comprise a button or switch 132 that may be used to control the operation of the gate 100.

When the shaft 106 is rotated in a first direction (e.g., counter-clockwise), it causes arms 108 to extend outwards towards wall 120 until the ends of the arms 122 engage the wall 120. Thus, the gate 100 is in an extended state, which substantially prevents access through the gate 100.

Turning now to FIG. 1B, when the shaft 106 is rotated in a second direction (e.g., clockwise), it causes arms 108 to retract towards housing 102 and away from wall 120. Thus, the gate 100 is in a retracted state, which access through the gate 100 is no longer substantially prevented.

Figure 3A:
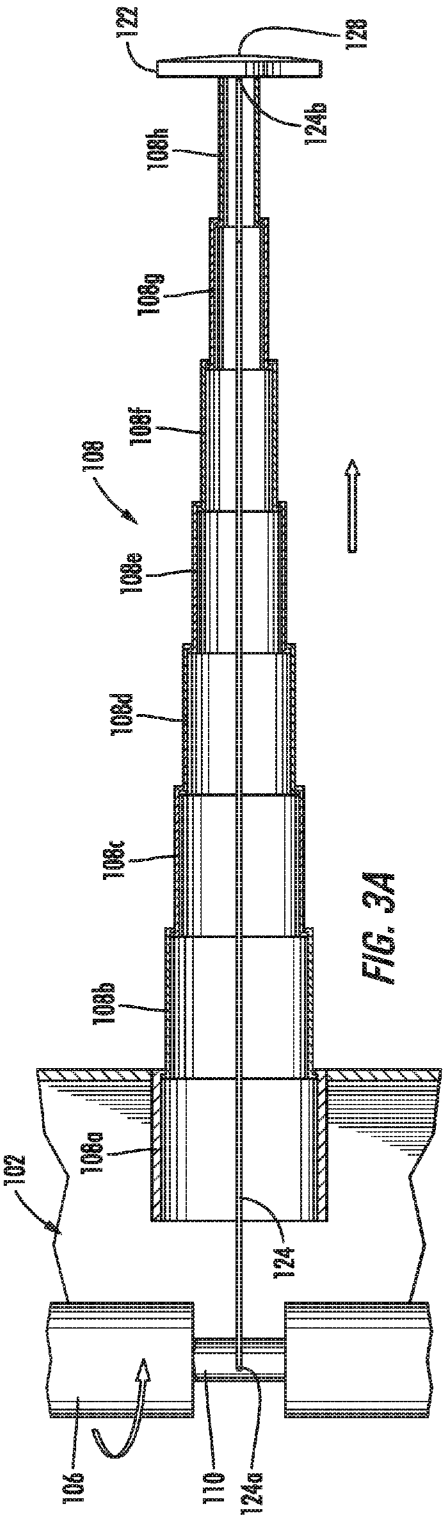
FIG. 3A illustrates a cross-sectional view of a portion of a gate system and apparatus, whereby the gate is in an extended state.

Turning now to FIG. 3A, a detailed cross-sectional view of one of arms 108 is shown, which is exemplary of how each of arms 108 operates. Portion 110 has a connector 124 that is adapted to wind and unwind around the portion 110. The connector 124 may be wire (e.g., copper, steel, nylon etc.), rope, thread, string, mesh, or any other material suitable for connecting two things together. While not explicitly shown, the connector 124 may also have teeth adapted to engage gears or indentions of portions 110. The connector 124 has a first end 124*a* and a second end 124*b*. First end 124*a* is coupled to portion 110. For example, the first end 124*a* may be coupled to portion 110 via a hook or other type of connection, so that when connector 124 is fully unwound from portion 110 the connector 124 remains firmly connected to the portion 110. While a hook is used for exemplary purposes here, those having ordinary skill in the art would appreciate that any known coupling mechanism could be used to couple the first end 124*a* to portion 110, including but not limited to by solder, adhesive, threaded and/or latching engagement. The second end 124*b* of the connector 124 is coupled to the interior end of gate arm 122.

Figure 3B:
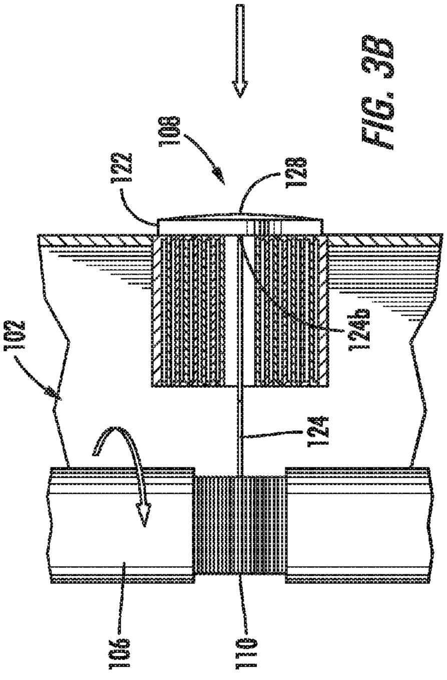
FIG. 3B illustrates a cross-sectional view of a portion of a gate system and apparatus, whereby the gate is in a retracted state.

The arm 108 includes a plurality of portions 108*a*-108*h* that are adapted to slide into one another. For example, portion 108*b* slides into portion 108*a*; portion 108*c* slides into portion 108*b*; portion 108*d* slides into portion 108*c*; portion 108*e* slides into portion 108*d*; portion 108*f* slides into portion 108*e*; portion 108*g* slides into portion 108*f*; and portion 108*h* slides into portion 108*g*. Therefore, when arm 108 is fully extended as shown in FIG. 3A, portions 108*a* to 108*h* are further apart because each of those portions are slid further apart from one another. Conversely, when arm 108 is fully retracted as shown in FIG. 3B, portions 108*a* to 108*h* are closer together because each of those portions are slid further into one another. Those of skill in the art would appreciate that by using arms like those described above, the size of each arm can be substantially reduced when in the retracted state. Moreover, those having ordinary skill in the art would also appreciate that the arms described above may conveniently adapt to the dimensions of the passageway in which the gate is used. For example, if the length of each arm is greater than the width of the passageway, the gate will still function properly because the nature of the arms allows them to extend to a length less than their maximum length.

The first portion 108*a* of arm 108 may be attached to the housing 102 by any well-known method in the art. For example, the first portion 108*a* may be welded, bolted, screwed, or threadingly engaged to the housing. As such, the first portion 108*a* may act as a base of support for arm 108.

The arms 108 may be, for example, concentric tubular arms or telescopic arms that are substantially parallel to one another as shown in FIG. 3A and FIG. 3B. As yet another example, the arms 108 may also be nested arms, which are similar to concentric arms except that the portions do not necessarily have the same center. The arms 108 may be made of any suitable material, including but not limited to titanium, steel, and/or plastic.

In the present embodiment, each portion 108*a*-108*h* may be approximately 4½ inches in length, but those having ordinary skill in the art would understand that the portions 108*a*-108*h* can be any desired length, so long as the arms 108 retain sufficient rigidity and support to extend substantially outward from the housing 102 when in the fully extended position. However, those of ordinary skill would also recognize that the length of each portion 108*a*-108*h* affects the overall size of the gate when the arms 108 are in the retracted state. For example, if each portion 108*a*-108*h* is 6 inches in length, then the smallest possible length for the arms of the gate would be 6 inches in the retracted state. As such, using the smallest portions necessary, while at the same time retaining sufficient stability and rigidity of the arms, may be desired to minimize the overall size of the gate system.

In the present embodiment, there may be approximately a ⅛ inch difference in diameter between adjacent portions of an arm, and each portion may have a material thickness of 0.038 inches. For example, portion 108*a* may be 1½ inches in diameter; portion 108*b* may be 1⅜ in diameter; portion 108*c* may be 1¼ inches in diameter; portion 108*d* may be 1⅛ inches in diameter; portion 108*e* may be 1 inch in diameter; portion 108*f* may be ⅞ inches in diameter; and portion 108*g* may be ¾ inches in diameter; and portion 108*h* may be ⅝ inches in diameter. However, those of skill in the art would understand that the diameter of each portion 108*a*-108*h* could have a greater or smaller dimensions, depending on the desired application of the gate. For example, if the gate is intended to prevent access for a very small pet, a higher number of arms having smaller diameters and thickness may be desired. Conversely, if the gate is intended to prevent access there through for a car, a few number of arms having greater diameters and thickness may be desired.

When the motor 104 rotates shaft 106 in a first direction (e.g., counter-clockwise), connector 124 unwinds from portion 110 and the second end 124*b* of connector 124 exerts a physical force on end of arm 122, causing the arm 108 to extend. Specifically, as connector 124 unwinds from portion 110, second end 124*b* of connector 124 exerts a physical force on the interior of an end of arm 122, thereby causing portions 108*a*-108*h* to slide further apart from one another. The connector 124 may be made of any material having suitable stiffness and flexibility for the purpose described above. For example, the connector may be a stiff nylon connector having sufficient flexibility to wind about a part, while at the same time retaining the necessary amount of stiffness to allow the connector to exert sufficient force to cause an arm to extend.

As the arm 108 extends, it eventually contacts wall 120 such that the gate arm 108 create a barrier that substantially prevents access through the gate. To ensure that the arm 108 retains the desired stability, the arm 108 may be configured to extend until a certain level of force is exerted on the wall by the end of the arm 122. For example, the motor 104 may be configured to rotate counter-clockwise such that the arm 108 exerts 20 pounds of force on the wall so that the arms 108 reach the desired level of force to ensure the arms 108 are not easily displayed by a force (e.g., the weight of a pet against the arm 108). While 20 pounds of force is given as an example of a desired force here, those having skill in the art would understand that the desired force may depend on a number of factors, including the force expected to be exerted on the arm 108. For example, if the gate 100 is intended to be used to confine a larger pet (e.g., a 75 lb dog), then the desired force of the arm 108 against the wall 120 may be much higher to ensure that the arm 108 is more difficult to displace by the force applied by a pet. Once the arm 108 is sufficiently extended, the shaft 106 may lock into position such that it will not rotate until the motor 104 is caused to rotate clockwise.

The end of arm 122 may further be comprised of a pliable and/or soft material 128 such that when the end makes contact with, for example, wall 120, the end 122 will not cause damage to the wall. For example, the pliable and/or soft material 128 may be rubber such that the end of the arms will not cause damage when they exert a force against wall 120. Moreover, the use of a pliable material, such as rubber, may be especially advantageous as it would assist the end of arm 122 in gripping the wall to ensure it does not slide around, ultimately improving the gate's stability.

Figure 2:
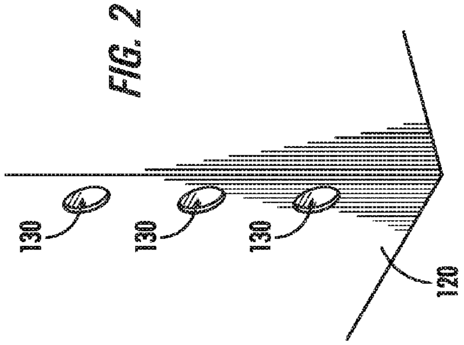
FIG. 2 illustrates a mechanism for providing additional stability to arms of a gate.

Alternatively, as shown in FIG. 2, a series of recesses 130 in wall 120 may be used to secure the arms 108 to the wall 120. Thus, when the end of the gate arms 122 extend and abut recesses 130, the gate arms 108 are secured in position such that they are substantially incapable of moving vertically or laterally. As would be understood by those having ordinary skill in the art, by using the recesses 130 the need for exerting additional force on the wall 120 by the end of the arms 108 is reduced because the recesses act an alternative mechanism for stabilizing the arms 108. While the recesses 130 shown in FIG. 2 are physically part of the wall 120, those of ordinary skill would appreciate that the recesses 130 could also be embedded in a member that can be attached to a wall. For example, the recesses could be embedded in a longitudinal member (e.g., a longitudinal thin piece of wood) that can be mounted to a wall, so that the recesses do not have to be part of the wall. Additionally, instead of using recesses on a wall, the wall could have protruding members that fit into a passage on the end of arms 122, which would accomplish the same function as the mechanism in FIG. 2. Those of ordinary skill in the art would also understand that a latch mechanism could also be used on wall 120 to aid in securing the arms 108. In addition to stabilizing the arms 108, the latch mechanism may also be used to lock the arms 108 in place so that a pet or child cannot cause the arms to retract by manually pulling or pushing the arms 108 towards the housing.

Turning back to FIG. 1A and FIG. 1B, the gate apparatus 100 of the present embodiment may further comprise a user input device, such as a switch or button 132. When the user input 132 is pressed a first time, the motor 104 may rotate the shaft 106 counter-clockwise, causing arms 108 to extend as shown in FIG. 1A and as described in detail above. When the switch or button 132 is pressed a second time, the motor 104 rotates clockwise, causing arms 108 to retract as shown in FIG. 1B and as described in detail above. The gate apparatus 100 may further be configured to permit a user to program the length of the arms' extension. For example, when a user presses the input 132 for a first time, the user may hold the input 132 down until the arms 108 extend the desired length. Once the arms 108 extend the desired length, the user may release the input 132, thereby programming the gate to extend the arms 108 that desired length every other time the user presses the input 132 for a short period of time. Thus, going forward, the user need only press the user input 132 and quickly release (e.g., less than 1 second) it to cause the motor 104 to fully extend the arms 108 and then press the user input 132 and quickly release again to cause the motor to fully retract the arms 108.

Alternatively, the motor 104 may be configured to automatically stop turning without the need for user programming. For instance, when a certain threshold of physical resistance is reached (e.g., resistance caused by the arms 108 attempting to extend into the wall 120), the motor 104 may stop rotating. Those of skill in the art would understand that there are a number of well-known ways of accomplishing this, such as measuring the resistance of the motor as load increases to determine when the motor has reached a certain level of resistance. As such, the system may have a sensor that senses an obstruction in the path of the arms based on the load on the motor.

As yet another alternative, the gate arms 108 may be extended and retracted by holding the user input 132 for the entire duration of the desired extension/retraction. For example, if a user wants the gate to fully retract, the user may hold the user input 132 until the gate is entirely retracted. Conversely, if a user wants the gate to fully extend, the user may hold the user input 132 until the gate is fully extended. As such, there may be no need for programming of the gate by the user.

As a safety precaution, the user input 132 may further comprise a cover (not shown) that latches over the user input 132 to prevent access by children. The cover may be any suitable form of child-proof/tamper-proof mechanism known in the art.

Figures 4A, 4B:
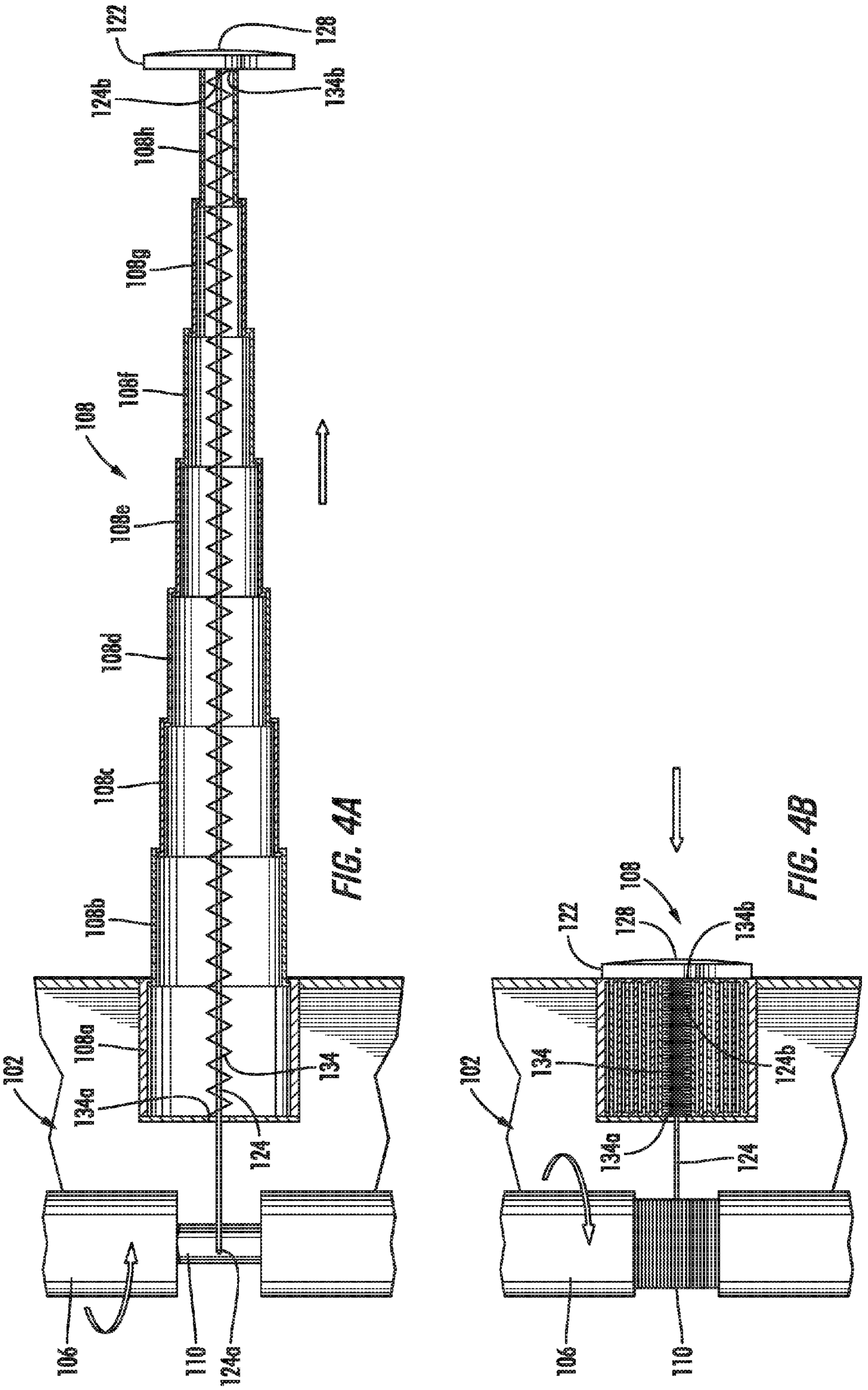
FIG. 4A illustrates a cross-sectional view of a portion of a gate system and apparatus that comprises a spring, whereby the gate is in an extended state.
FIG. 4B illustrates a cross-sectional view of a portion of a gate system and apparatus that comprises a spring, whereby the gate is in a retracted state.

Turning now to FIG. 4A and FIG. 4B, an alternative embodiment of arms 108 is shown. This alternative embodiment comprises many of the same components included as part of gate apparatus 100, and so for the sake of brevity the same element identifiers have been used for identical components. Unlike the embodiment shown in FIG. 3A and FIG. 3B, arm 108 includes a spring 134. A first end 134*a* of the spring 134 is coupled to the end of the arm 108 coupled to the housing 102. A second end 134*b* of the spring 134 is coupled to the end of arm 122 that extends away from the housing 102. The spring 134 generates an outward spring force against the interior end of arm 122. The connector 124 is coupled to the interior end of the arm 122 such that when the motor 104 rotates clockwise the connectors pull the end of arm 122 with sufficient force to overcome the outward force created by the springs 134 in turn causing the arms 108 to fully or near fully retract, as shown in FIG. 4B. Thus, when the arm 108 is in the fully retracted state, the motor 104 may rotate counter-clockwise to unwind connector 124 from the shaft 106, thereby allowing the spring 134 to decompress. As the spring 134 decompresses, it exerts a spring force against the interior end of arm 122, which in turn extends the arm 108. Conversely, when the arm 108 is in the fully extended state, the motor 104 may rotate clockwise to wind connector 124 around the shaft 106, thereby pulling the end of arm 122 inward and overcoming the spring force until the arm 108 is in the fully retracted or near fully retracted state. In some circumstances, it may be preferred to lock the shaft 106 locked into position to prevent the spring force from causing the connector 124 to unwind when the motor 104 is not turning the shaft 106. Those having ordinary skill in the art would appreciate that by using springs to generate an outward force, the need for a stiff connector may not be necessary.

Figure 5A:
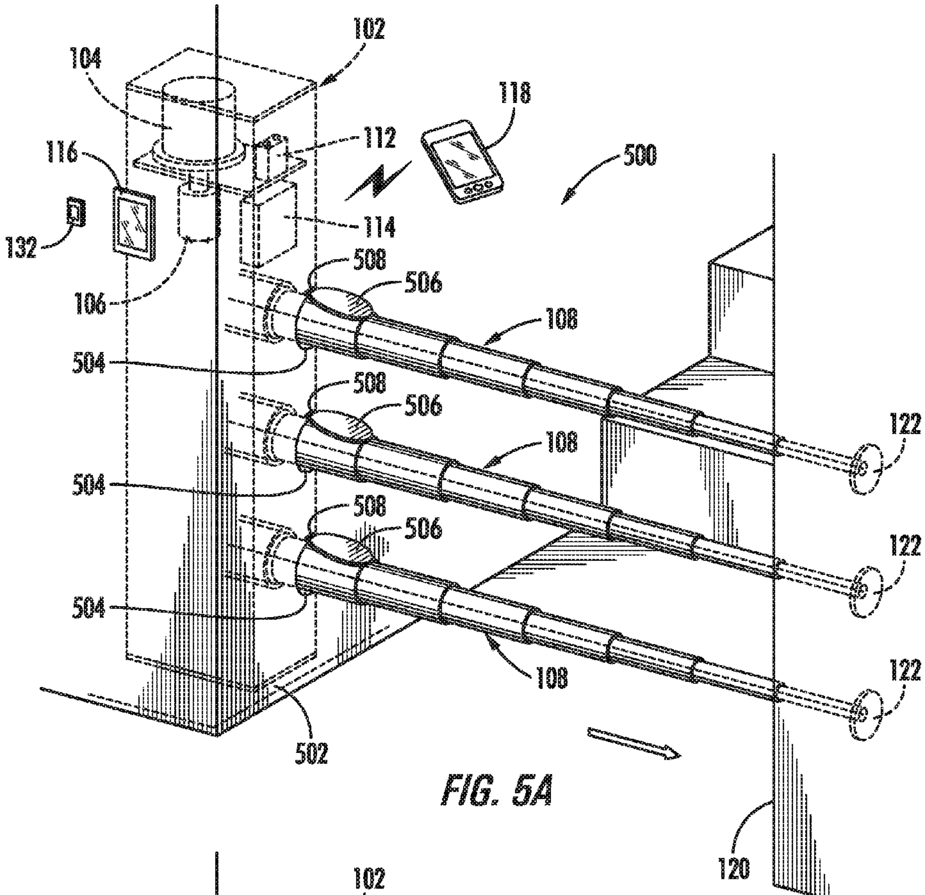
FIG. 5A illustrates a gate system and apparatus embedded in a wall and comprising a motor, whereby the gate is in an extended state.
Figure 5B:
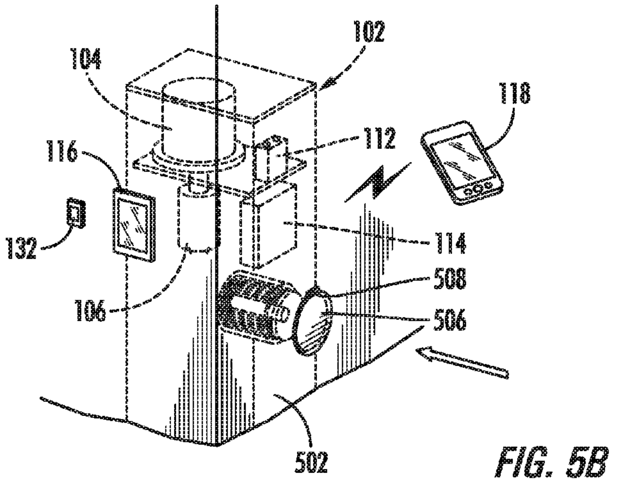
FIG. 5B illustrates a gate system and apparatus embedded in a wall and comprising a motor, whereby the gate is in a retracted state.

Turning now to FIG. 5A, an embodiment is shown where gate apparatus 500 is embedded in a wall 502. Gate apparatus 500 comprises many of the same components included as part of gate apparatus 100, and so for the sake of brevity the same element identifiers have been used for identical components. As shown here, rather than gate apparatus 500 being attached to the exterior of a wall, the gate apparatus 500 is embedded into wall 502. As such, the gate apparatus 500 consumes even less space through the passage way than in the embodiments shown, for example, in FIG. 1 and FIG. 3. Those having ordinary skill in the art would appreciate that many walls or doorways provide sufficient cavity space to embed a gate apparatus, such as gate apparatus 500. Once the gate apparatus 500 has been placed in the wall, the wall or door jamb seal may be resealed over the gate apparatus 500, except for openings 504 for the arms 108 to extend and retract through. The openings 504 are covered by covers 506, respectively, when the arms 108 are in the fully retracted states, as shown in FIG. 5B. The covers 506 may be connected to the wall via small hinges 508, such that the covers 506 are able to rotate about an axis and cover or uncover the openings 504. For example, when the arms 108 are fully retracted as shown in FIG. 5B, the weight of each cover 506 allows them to rotate about each of their hinges 508 such that the covers 506 cover their respective openings 504. Conversely, when the arms 108 extend as shown in FIG. 5A, the end of each arm 122 exerts a force against its respective cover 506 and causes the covers 506 to rotate about their hinges 508 such that the covers 506 open and allow arms 108 to extend outward unobstructed. Thus, when the arms 108 are fully retracted, the covers 506 conceal the openings 504 and when the arms 108 are extending, the covers 506 open to allow the arms 108 to pass through openings 504 so that they can create a barrier sufficient to substantially prevent access through the gate. The use of covers 506 may be particularly advantageous as they conceal the openings 504 when the gate is fully retracted and they can simply be painted over to match the wall color, which may be desired for aesthetic purposes. While in the present embodiment the gate system and apparatus is embedded in a wall, those having ordinary skill in the art would understand the system could also be embedded in a doorway or any other desired passageway.

While in the present embodiments the motor 104 is a DC motor, those having ordinary skill in the art would understand that an AC motor could be used in lieu of the DC motor. Those of skill would appreciate that DC motors present certain advantages over AC motors and vice versa. For example, a DC motor may be powered using a DC battery (e.g., a 9-volt store bought battery), which allows for the motor to be powered without being physically connected to, for example, a conventional 120 volt AC outlet. As yet another example, an AC motor may be powered using a conventional 120-volt AC outlet, which allows for the motor to be powered without the need for replaceable DC batteries, which may be more expensive to replace over time. For example, in the embodiment illustrated in FIG. 5, the use of AC power may be particularly suitable because the AC power conduit already existing in the wall 502 may easily be connected to an AC motor of the gate apparatus 500. Those having ordinary skill in the art would also appreciate that the motor could be adapted to rotate the shaft in any direction (e.g., clockwise or counter-clockwise) to cause the gate arms to extend or retract. For example, in certain embodiments the motor may rotate counter-clockwise to cause the arms to extend, whereas in other embodiments the motor may rotate clockwise to cause the arms to extend.

Figure 6B:
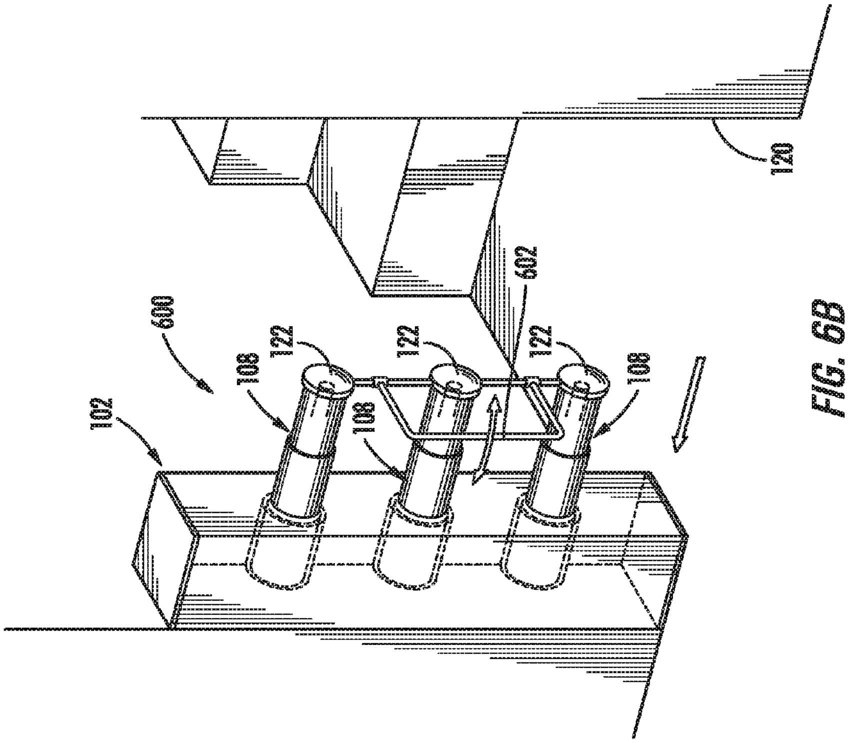
FIG. 6B illustrates a gate system and apparatus comprising a handle or grip for manually actuating the gate, whereby the gate is in a retracted state.
Figure 6A:
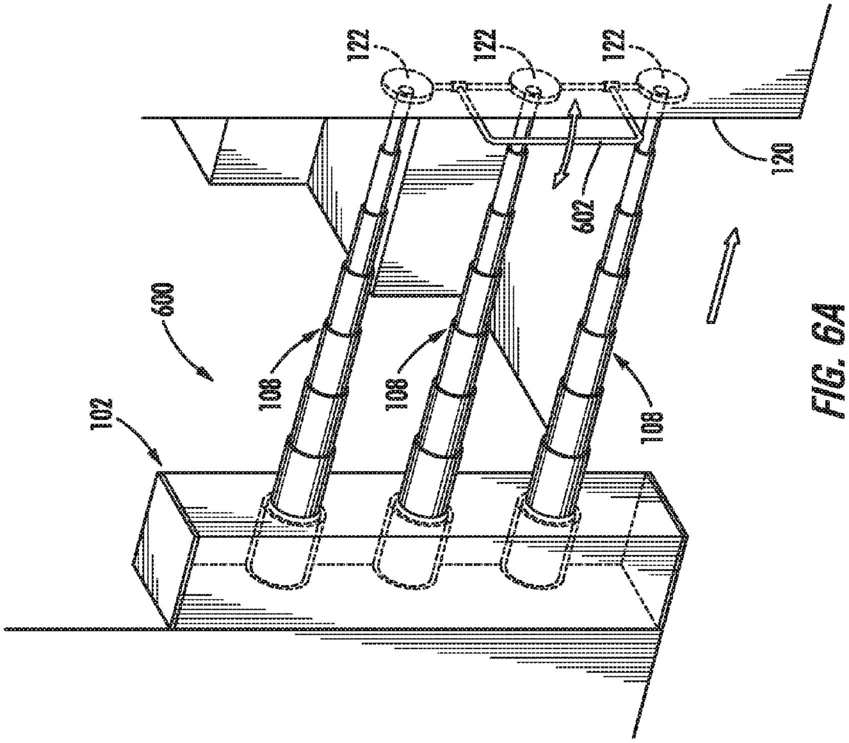
FIG. 6A illustrates a gate system and apparatus comprising a handle or grip for manually actuating the gate, whereby the gate is in an extended state.

Turning now to FIG. 6A, an alternative embodiment of a gate apparatus 600 is shown. Gate apparatus 600 comprises some of the same components included as part of gate apparatus 100, and so for the sake of brevity the same element identifiers have been used for identical components. However, unlike the embodiments illustrated in the prior figures, gate apparatus 600 does not include a motor. Instead, the arms 108 of gate apparatus 600 may be extended or retracted manually by pulling or pushing on a handle or grip 602. For example, a user may push or pull on the handle or grip 602 to cause the arms 108 to extend, as shown in FIG. 6A. Conversely, a user may push or pull on the handle or grip 602 to cause the arms 108 to retract, as shown in FIG. 6B. Those having ordinary skill in the art would appreciate that this embodiment may be lighter and more inexpensive to manufacture, as a number of components from the electronic embodiments previously described may not be required.

Figure 7:
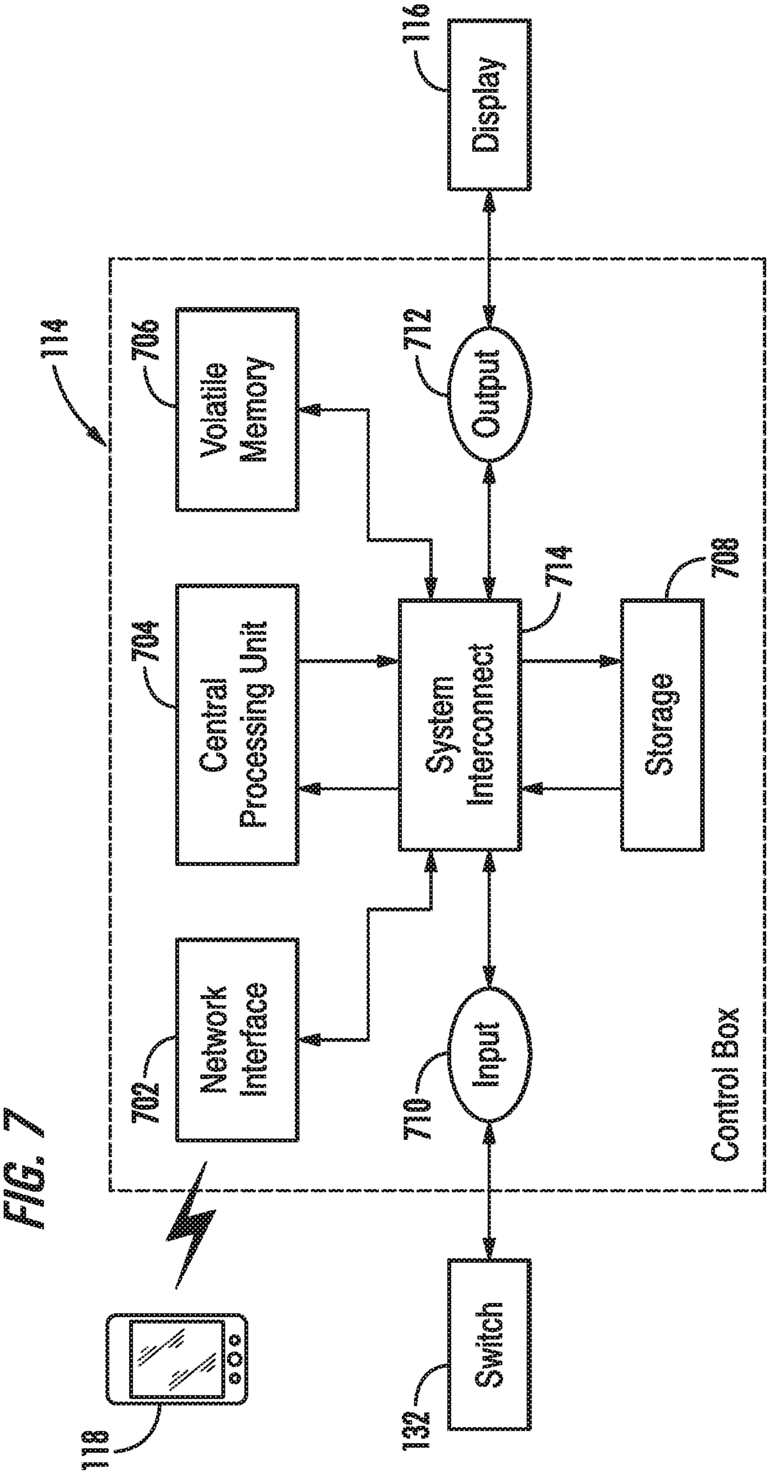
FIG. 7 illustrates electrical components of a gate system and apparatus that may be useful with embodiments of the present invention.

Turning now to FIG. 7, a detailed illustration of control box 114 is shown for controlling the operation of certain embodiments described herein. The control box 114 comprises a network interface 702, central processing unit (CPU) 704, volatile memory 706 (e.g., RAM), storage 708 (e.g., a hard drive), input 710 and output 712. The components of the control box 114 communicate internally via system interconnect 714. The input 710 may be connected to an input device, such as switch/button 132. While not shown, the user input 710 could alternatively be coupled to a touchscreen display. The output 712 may be coupled to a display 116, such as an LCD display or touchscreen display. The CPU 704 is adapted to control the operation of the gate apparatus by extending and retracting the arms of the gate by controlling a motor. The network interface 702 may be adapted to allow the gate to be controlled remotely. For example, the network interface 702 communicate with a remote device, such as cellular phone 118, by leveraging a WiFi internet connection in the user's home. Alternatively, the wireless network interface 702 may be a cellular modem that can wirelessly connect to the user's cellular telephone without leveraging the user's internet (e.g., by communicating directly with a cellular tower). The network interface 702 may receive a signal over a wireless medium that instructs the CPU 704 to extend or retract the arms of the gate. Thus, a user may open and close the gate without having to physically actuate the switch or button 132. Moreover, the system may be designed to automatically detect the presence or absence of a signal near the gate, such as an NFC field or RFID field generated by a user's cellular phone or other device. Thus, the gate may automatically open when the user is in proximity of the gate so that the gate does not need to physically be actuated (e.g., by actually pressing the switch or button 132).

While not shown, the electronic embodiments described thus far may further comprise a sensor or a plurality of sensors for sensing an obstruction in the path of the gate as the gate extends. For example, the obstruction may be a pet or baby. When the sensor(s) are triggered, the gate will stop extending or retract so that the pet or baby in the path is not inadvertently pinned against the wall. Such sensor(s) could be, for example, LED based sensors that are triggered when an object obstructs the path of the LEDs. Alternatively, such sensor(s) could be a motion sensor that detects motion in the path of the extending gate arms, including but not limited to an infrared motion detector/sensor. Those of skill would appreciate that such sensors or detectors provide a useful safety feature that may help prevent bodily injury to humans or pets.

While in certain of the disclosed embodiments a single motor is used, those having ordinary skill in the art would understand that the described embodiments could be implemented using a plurality of motors. For example, referring back to FIG. 1, instead of just motor 104 being mounted in the top of the shaft, a second motor could also be coupled to the bottom of the shaft as well. Thus, there may be two motors working synchronously together to turn the shaft. This may provide a number of advantages, such as additional torque that may be used to extend and retract the arms. As yet another example, referring back to FIG. 1, instead of a single housing being used, another housing could be used on the opposite side such that arms extend inward from both sides of the entry way.

While in the present embodiments the arms are tubular concentric arms, those of skill would understand that concentric non-tubular arms could be used instead. For example, concentric square arms could be used as well. Moreover, nested arms could be used, which are not necessarily concentric.

Further, while in many embodiments three arms are shown, those having ordinary skill in the art would understand that a greater or fewer number of arms could be used in an embodiment of the present invention. For example, ten arms having small diameters and thickness could be used in lieu of three arms having larger diameters and thickness. Those of skill would appreciate that the number of arms and dimension of each arm (e.g., length, width, thickness) could be modified in any desired manner without deviating from the scope of the present invention. For instance, a single arm could be used in certain embodiments, while in others a plurality of arms is desired. Moreover, while the disclosed embodiments include eight different portions for each arm, those having ordinary skill in the art would understand that more or less portions could be used. For example, two portions could be used depending on the desired length of the arms.

Further, while the disclosed embodiments illustrate a gate having arms that extend and retract horizontally, those having ordinary skill in the art would appreciate that the gate could be configured to extend and retract the arms vertically, diagonally, or in any other direction.

Additionally, while some of the embodiments disclosed herein come in the context of gates for limiting access of pets, those of ordinary skill would understand that the disclosed invention has a diverse array of applications. For example, the same gate concepts disclosed herein could be applied in the context of residential car gates that control access to a residential community. Indeed, any application that requires the control of access to a particular area is a prime candidate for the invention disclosed herein.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the term "coupled" as used in the specification and/or claims should be interpreted to include direct and/or indirect coupling and the term "connected" as used in the specification and/or claims should be interpreted to include direct and/or indirect coupling.

The invention claimed is:

1. An apparatus comprising:

(a) at least one motor coupled to a shaft, wherein the motor is configured to rotate the shaft bidirectionally;

(b) a first arm, wherein the first arm has a first portion and a second portion and at least part of the second portion of the first arm is configured to slide into and out of the first portion of the first arm, wherein the first arm has a first state and a second state, wherein in the first state of the first arm the second portion of the first arm is extended away from the first portion of the first arm, wherein in the second state of the first arm the second portion of the first arm is retracted towards the first portion of the first arm, (c) a second arm, wherein the second arm has a first portion and a second portion and at least part of the second portion of the second arm is configured to slide into and out of the first portion of the second arm, wherein the second arm has a first state and a second state, wherein in the first state of the second arm the second portion of the second arm is extended away from the first portion of the second arm, wherein in the second state of the second arm the second portion of the second arm is retracted towards the first portion of the second arm, (d) a first connector connecting the shaft to the first arm, wherein the first connector passes through at least one opening in the first arm; and (e) a second connector connecting the shaft to the second arm, wherein the second connector passes through at least one opening in the second arm;

wherein rotation of the shaft in a first direction transitions the first arm and the second arm from their respective first states to their respective second states and rotation of the shaft in a second direction transitions the first arm and the second arm from their respective second states to their respective first states.

2. The apparatus of claim 1, wherein an end of the first arm and an end of the second arm are configured to engage at least one recess when the first arm and the second arm are in their second states, so that movement of the first arm and the second arm becomes more limited.

3. The apparatus of claim 1 further comprising a network interface.

4. The apparatus of claim 3, wherein the first arm and the second arm automatically transition from one state to another state based on a sensed presence or absence of an electronic device.

5. The apparatus of claim 1 further comprising a display for displaying information relating to the operation of the apparatus.

6. The apparatus of claim 1, wherein the the first arm and the second arm are configured to extend and retract in a vertical direction.

7. The apparatus of claim 1, wherein the first arm and second arm are concentric or nested arms.

8. The apparatus of claim 1 further comprising a cover that covers a hole through which at least one arm retracts when the first arm and the second arm are in their respective second states and uncovers the hole when the first arm and the second arm are in their respective first states.

9. The apparatus of claim 1 further comprising a sensor configured to detect an obstruction in a plane through which the first or second arm extends.

10. An apparatus comprising:

(a) at least one motor coupled to a shaft, wherein the motor is adapted to rotate the shaft bidirectionally;

(b) a first arm, wherein the first arm comprises a first portion and a second portion and at least part of the second portion of the first arm is configured to slide into and out of the first portion of the first arm, wherein the first arm has a first state and a second state, wherein in the first state of the first arm the second portion of the first arm is extended away from the first portion of the first arm, wherein in the second state of the first arm the second portion of the first arm is retracted towards the first portion of the first arm, (c) a second arm, wherein the second arm comprises a first portion and a second portion and at least part of the second portion of the second arm is configured to slide into and out of the first portion of the second arm, wherein the second arm has a first state and a second state, wherein in the first state of the second arm the second portion of the second arm is extended away from the first portion of the second arm, wherein in the second state of the second arm the second portion of the second arm is retracted towards the first portion of the second arm, (d) a first connector connecting the shaft to the first arm, wherein the first connector passes through at least one opening in the first arm;

(e) a second connector connecting the shaft to the second arm, wherein the second connector passes through at least one opening in the second arm;

(f) a first spring within the first portion and second portion of the first arm; and (g) a second spring within the first portion and second portion of the second arm;

wherein rotation of the shaft in a first direction allows the first spring and second spring to decompress and transitions the first arm and the second arm from their respective first states to their respective second states and rotation of the shaft in a second direction compresses the first spring and second spring and transitions the first arm and the second arm from their respective second states to their respective first states.

11. The apparatus of claim 10, wherein an end of the first arm and an end of the second arm are configured to engage a recess when the first arm and the second arm are in their second states, so that movement of the first arm and the second arm becomes more limited.

12. The apparatus of claim 10 further comprising a network interface.

13. The apparatus of claim 12, wherein the first arm and the second arm automatically transition from one state to another state based on a sensed presence or absence of an electronic device.

14. The apparatus of claim 10 further comprising a display for displaying information relating to the operation of the apparatus.

15. The apparatus of claim 10 further comprising a cover that covers a hole through which at least one arm retracts when the first arm and the second arm are in their respective second states and uncovers the hole when the first arm and the second arm are in their respective first states.

16. The apparatus of claim 10, wherein the first arm and second arm are concentric or nested arms.

17. The apparatus of claim 10 further comprising a sensor configured to detect an obstruction in a plane through which the first or second arm extends.

18. An apparatus comprising:

(a) a housing;

(b) a first arm coupled to the housing, wherein the first arm comprises a first portion and a second portion and at least part of the second portion of the first arm is adapted to slide into and out of the first portion of the first arm, wherein the first arm has a first state and a second state, wherein in the first state of the first arm the second portion of the first arm is extended away from the first portion of the first arm, wherein in the second state of the first arm the second portion of the first arm is retracted towards the first portion of the first arm;

(c) a second arm coupled to the housing, wherein the second arm comprises a first portion and a second portion and at least part of the second portion of the second arm is adapted to slide into and out of the first portion of the second arm; and wherein the second arm has a first state and a second state, wherein in the first state of the second arm the second portion of the second arm is extended away from the first portion of the second arm, wherein in the second state of the second arm the second portion of the second arm is retracted towards the first portion of the second arm, (d) a cover that covers a hole through which at least one arm retracts when the first arm and the second arm are in their respective second states and uncovers the hole when the first arm and the second arm are in their respective first states.

19. The apparatus of claim 18 further comprising:

a handle, wherein movement of the handle in a first direction begins to transition the first arm and the second arm from their respective first states to their respective second states and movement of the handle in a second direction begins to transition the first arm and the second arm from their respective second states to their respective first states.

* * * * *

UNITED STATES PATENT AND TRADEMARK OFFICE

CERTIFICATE OF CORRECTION

PATENT NO. : 9,689,189 B1
APPLICATION NO. : 15/333124
DATED : June 27, 2017
INVENTOR(S) : Stephen Douglas Zinda It is certified that error appears in the above-identified patent and that said Letters Patent is hereby corrected as shown below:

In the Claims

Column 11, Line 54: Delete the word “second” in the phrase “second states” and replace with the word “first”.

Column 11, Line 65: Delete the second instance of “the” in “the the”.

Column 12, Line 51: Delete the word “first” in “respective first states” and replace with the word “second”; and delete the word “second” in “respective second states” and replace with the word “first.”.

Column 12, Line 55-56: Delete the word “second” in “respective second states” and replace with the word “first”; and delete the word “first” in “respective first states” and replace with the word “second.”.

Column 12, Line 60: Delete the word “second” in the phrase “second states” and replace with the word “first”.

Signed and Sealed this
Eighth Day of August, 2017

Joseph Matal

Joseph Matal
*Performing the Functions and Duties of the*
*Under Secretary of Commerce for Intellectual Property and*
*Director of the United States Patent and Trademark Office*